(12) United States Patent
Kim et al.

(10) Patent No.: US 8,928,748 B2
(45) Date of Patent: Jan. 6, 2015

(54) DIGITAL PHOTOGRAPHING APPARATUS, METHOD OF CONTROLLING THE SAME AND RECORDING MEDIUM HAVING RECORDED THEREON COMPUTER PROGRAM TO IMPLEMENT THE METHOD

(75) Inventors: In-su Kim, Changwon (KR); Hong-seok Choi, Changwon (KR); Seok-ho Jeon, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 1105 days.

(21) Appl. No.: 12/424,738

(22) Filed: Apr. 16, 2009

(65) Prior Publication Data
US 2010/0053321 A1     Mar. 4, 2010

(30) Foreign Application Priority Data
Aug. 29, 2008 (KR) ........................ 10-2008-0085525

(51) Int. Cl.
*H04N 7/18* (2006.01)
*H04N 5/232* (2006.01)
*H04N 5/14* (2006.01)

(52) U.S. Cl.
CPC ............... *H04N 5/232* (2013.01); *H04N 5/144* (2013.01); *H04N 5/23229* (2013.01)
USPC ........... 348/135; 348/143; 348/169; 382/173; 382/307; 382/103; 370/240.12; 370/240.16

(58) Field of Classification Search
CPC .... H04N 5/232; H04N 5/23229; H04N 5/144
USPC .......... 348/135, 143, 169; 382/173, 307, 103; 370/240.12, 240.16
See application file for complete search history.

(56) References Cited

U.S. PATENT DOCUMENTS 7,181,080 B2    2/2007 Kondo et al.
7,265,777 B2 *  9/2007 Chen et al. .................... 348/155

(Continued)

FOREIGN PATENT DOCUMENTS

| CN | 1111884 A | 11/1995 |
|---|---|---|
| EP | 0 639 924 A2 | 2/1995 |
| KR | 10-2004-0014951 A | 2/2004 |

OTHER PUBLICATIONS

Office Action established for CN 200910146101.9 (Oct. 26, 2011).

(Continued)

*Primary Examiner* — Thuong Nguyen
(74) *Attorney, Agent, or Firm* — Drinker Biddle & Reath LLP

(57) ABSTRACT

A digital photographing apparatus is provided that is capable of effectively distinguishing a background region and a motion region. Also provided is a method of controlling the digital photographing apparatus, and a recording medium having recorded thereon a computer program to implement the method. The digital photographing apparatus includes an imaging device generating data from light incident thereto, a first difference image data obtaining unit obtaining first difference image data regarding a first difference image, which represents a difference between a reference image and a current frame image, a second difference image data obtaining unit obtaining second difference image data regarding a second difference image, which represents a difference between the current frame image and a previous frame image, and a motion region determining unit determining a motion region in the current frame image, by using the first difference image data and the second difference image data.

7 Claims, 7 Drawing Sheets

(56) References Cited

U.S. PATENT DOCUMENTS

| | | | |
|---|---|---|---|
| 7,346,188 B2* | 3/2008 | Aichi | 382/103 |
| 8,094,936 B2* | 1/2012 | Woo et al. | 382/173 |
| 2001/0019586 A1* | 9/2001 | Kang et al. | 375/240.16 |
| 2003/0165193 A1* | 9/2003 | Chen et al. | 375/240.08 |
| 2004/0070680 A1* | 4/2004 | Oda et al. | 348/294 |
| 2004/0233283 A1* | 11/2004 | Kang et al. | 348/143 |
| 2005/0094849 A1* | 5/2005 | Sung et al. | 382/103 |
| 2006/0002471 A1* | 1/2006 | Lippincott et al. | 375/240.16 |
| 2006/0012715 A1* | 1/2006 | Abe | 348/584 |
| 2006/0098111 A1* | 5/2006 | Goh et al. | 348/333.05 |
| 2006/0280248 A1* | 12/2006 | Kim et al. | 375/240.16 |
| 2008/0100709 A1* | 5/2008 | Furukawa | 348/169 |
| 2010/0053321 A1* | 3/2010 | Kim et al. | 348/135 |
| 2010/0098165 A1* | 4/2010 | Farfade et al. | 375/240.16 |

OTHER PUBLICATIONS

Office Action established for KR 10-2008-0085525 (Apr. 15, 2013).

* cited by examiner

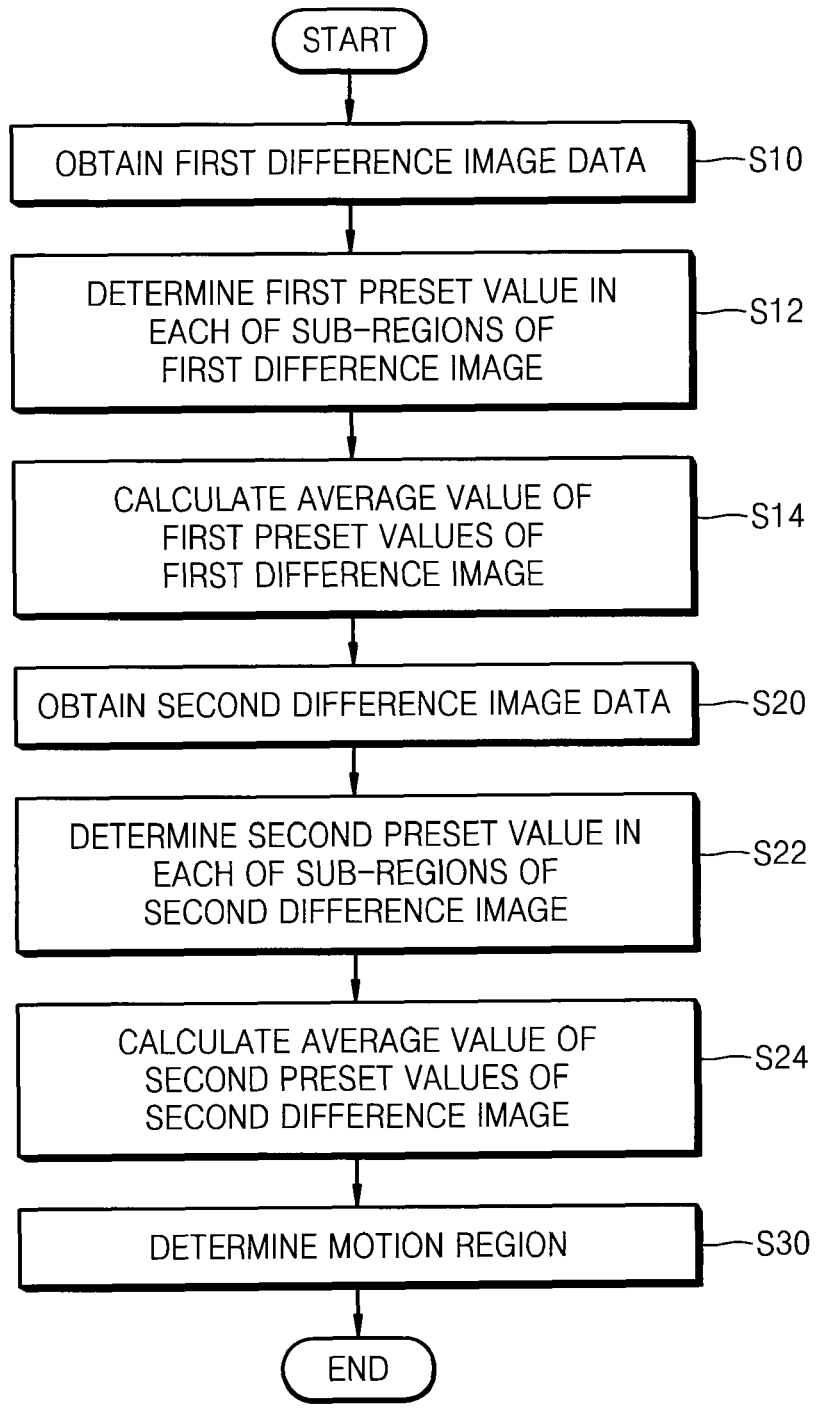

DIGITAL PHOTOGRAPHING APPARATUS, METHOD OF CONTROLLING THE SAME AND RECORDING MEDIUM HAVING RECORDED THEREON COMPUTER PROGRAM TO IMPLEMENT THE METHOD

CROSS-REFERENCE TO RELATED PATENT APPLICATION

This application claims the benefit of Korean Patent Application No. 10-2008-0085525, filed on Aug. 29, 2008 in the Korean Intellectual Property Office, the entire contents of which is incorporated herein by reference.

BACKGROUND OF THE INVENTION

1. Field of the Invention

The present invention relates to a digital photographing apparatus, a method of controlling the same, and a recording medium having recorded thereon a computer program to implement the method. More particularly, the present invention relates to a digital photographing apparatus capable of effectively distinguishing a background region and a motion region, a method of controlling the same, and a recording medium having recorded thereon a computer program to implement the method.

2. Description of the Related Art

Generally, a digital photographing apparatus obtains data from light that is incident to an imaging device. The apparatus either stores the data to a recording medium or displays an image obtained from the data on a display unit. In particular, digital photographing apparatuses such as closed-circuit television (CCTV) cameras may also have a functionality of detecting motion and informing a user of the existence of a motion region, by obtaining data from light incident to an imaging device and analyzing the data.

However, such conventional digital photographing apparatuses often incorrectly determine a noisy region as being a motion region even when no motion region exists and/or determines a previously relocated background subject as a motion region even when there has been no motion for a significant time period after the background subject has been relocated.

SUMMARY OF THE INVENTION

The present invention provides a digital photographing apparatus capable of effectively distinguishing a background region and a motion region, a method of controlling the same, and a recording medium having recorded thereon a computer program to implement the method.

According to an embodiment of the present invention, a digital photographing apparatus is provided. The digital photographing apparatus includes an imaging device generating data from light incident thereto, a first difference image data obtaining unit obtaining first difference image data regarding a first difference image, which represents a difference between a reference image and a current frame image, a second difference image data obtaining unit obtaining second difference image data regarding a second difference image, which represents a difference between the current frame image and a previous frame image, and a motion region determining unit determining a motion region in the current frame image, by using the first difference image data and the second difference image data.

The motion region determining unit may determine a region of the first difference image in which the first difference image data is smaller than first preset values as a background region, may determine a region of the first difference image in which the first difference image data is greater than the first preset values and a corresponding region of the second difference image in which the second difference image data is greater than second preset values as motion regions, and may determine a region of the first difference image in which the first difference image data is greater than the first preset values and a corresponding region of the second difference image in which the second difference image data is smaller than the second preset values as sub-background regions.

If the motion region determining unit determines a particular region throughout a predetermined number of frame images as a sub-background region, the particular region may be newly determined as a part of a background region.

The first difference image data obtaining unit may divide each of the reference image and the current frame image into a plurality of sub-regions, may consider values obtained by processing data in each of the sub-regions as data for corresponding sub-regions, and may obtain the first difference image data regarding the first difference image including a plurality of sub-regions by using data in sub-regions of the reference image and the current frame image corresponding to each other, and the second difference image data obtaining unit may divide each of the reference image and the current frame image into a plurality of sub-regions, may consider values obtained by processing data in each of the sub-regions as data for corresponding sub-regions, and may obtain the second difference image data regarding the second difference image including a plurality of sub-regions by using data in sub-regions of the reference image and the current frame image corresponding to each other.

The first difference image data obtaining unit and the second difference image data obtaining unit may consider average values of each of the sub-regions as data of the corresponding sub-regions.

According to another embodiment of the present invention, a digital photographing apparatus is provided in which the digital photographing apparatus includes an imaging device generating data from light incident thereto, a first difference image data obtaining unit obtaining first difference image data regarding a first difference image, which represents a difference between a reference image and a current frame image, a first preset value determining unit dividing the first difference image into a plurality of sub-regions and determining first preset values, obtained by multiplying either a value of composition ratio of pixels having first difference image data of which the values are non-zero in each of the sub-regions or a value obtained by processing the value of composition ratio and either an average value of first difference image data in the corresponding sub-region or a value obtained by processing the average value, a first average obtaining unit obtaining an average value of first preset values of the first difference image, a second difference image data obtaining unit obtaining second difference image data regarding a second difference image, which represents a difference between the current frame image and a previous frame image, a second preset value determining unit dividing the second difference image into a plurality of sub-regions and determining second preset values, obtained by multiplying either a value of composition ratios of pixels having second difference image data of which the values are non-zero in each of the sub-regions or a value obtained by processing the value of a composition ratio and either an average value of second difference image data in the corresponding sub-region or a value obtained by processing the average value, a second average obtaining unit obtaining an average value of the second preset values of the second difference image, and a motion region determining unit determining a sub-region of the first difference image in which the first preset value is smaller than the average value of the first preset values as a background region, determining a sub-region of the first difference image in which the first preset value is greater than the average value of the first preset values and a corresponding sub-region of the second difference image in which the second preset value is greater than the average value of the second preset values as motion regions, and determining a sub-region of the first difference image in which the first preset value is greater than the average value of the first preset values and a corresponding sub-region of the second difference image in which the second preset value is smaller than the average value of the second preset values as sub-background regions.

If the motion region determining unit determines a particular region throughout a predetermined number of frame images as a sub-background region, the particular region may be newly determined as a part of a background region.

The first preset value determining unit may divide the first difference image into a plurality of sub-regions and may determine a value, obtained by multiplying a number of pixels having first difference image data of which values are non-zero in each of the sub-regions and either an average value of first difference image data in the corresponding sub-region or a value obtained by processing the average value, as a first preset value of the corresponding sub-region, and the second preset value determining unit may divide the second difference image into a plurality of sub-regions and may determine a value, obtained by multiplying a number of pixels having second difference image data of which values are non-zero in each of the sub-regions and either an average value of second difference image data in the corresponding sub-region or a value obtained by processing the average value, as a second preset value of the corresponding sub-region.

According to another embodiment of the present invention, a method of determining a motion region is provided. The method includes obtaining first difference image data regarding a first difference image, which represents a difference between a reference image and a current frame image, obtaining second difference image data regarding a second difference image, which represents a difference between a current frame image and a previous frame image, and determining a motion region in the current frame image, using the first difference image data and the second difference image data.

The determining of the motion region may include determining a sub-region of the first difference image in which a first preset value is smaller than the average value of first preset values as a background region, determining a sub-region of the first difference image in which the first preset value is greater than the average value of the first preset values and a corresponding sub-region of the second difference image in which a second preset value is greater than the average value of second preset values as a motion region, and determining a sub-region of the first difference image in which the first preset value is greater than the average value of the first preset values and a corresponding sub-region of the second difference image in which the second preset value is smaller than the average value of the second preset values as a sub-background region.

If the motion region determining unit determines a particular region throughout a predetermined number of frame images as a sub-background region, the particular region may be newly determined as a part of a background region.

When the first difference image data and the second difference image data are obtained, each of the reference image and the current frame image may be divided into a plurality of sub-regions, values obtained by processing data in each of the sub-regions may be considered as data for corresponding sub-regions, and the first difference image data regarding the first difference image including a plurality of sub-regions and the second difference image data regarding the second difference image including a plurality of sub-regions may be determined by using data in sub-regions of the reference image and the current frame image which correspond to each other.

Average values of each of the sub-regions may be considered as data of the corresponding sub-regions.

According to another embodiment of the present invention, a method of determining a motion region is provided in which the method includes obtaining first difference image data regarding a first difference image, which represents a difference between a reference image and a current frame image, dividing the first difference image into a plurality of sub-regions and determining first preset values, obtained by multiplying either a value of composition ratios of pixels having first difference image data of which the values are non-zero in each of the sub-regions or a value obtained by processing the value of a composition ratio and either an average value of first difference image data in the corresponding sub-region or a value obtained by processing the average value, obtaining an average value of the first preset values of the first difference image, obtaining second difference image data regarding a second difference image, which represents a difference between a current frame image and a previous frame image, dividing the second difference image into a plurality of sub-regions and determining second preset values, obtained by multiplying either a value of composition ratios of pixels having second difference image data of which the values are non-zero in each of the sub-regions or a value obtained by processing the value of a composition ratio and either an average value of second difference image data in the corresponding sub-region or a value obtained by processing the average value, obtaining an average value of the second preset values of the second difference image, determining a sub-region of the first difference image in which the first preset value is smaller than the average value of the first preset values as a background region, determining a sub-region of the first difference image in which the first preset value is greater than the average value of the first preset values and a corresponding sub-region of the second difference image in which the second preset value is greater than the average value of the second preset values as a motion region, and determining a sub-region of the first difference image in which the first preset value is greater than the average value of the first preset values and a corresponding sub-region of the second difference image in which the second preset value is smaller than the average value of the second preset values as a sub-background region.

If the motion region determining unit determines a particular region throughout a predetermined number of frame images as a sub-background region, the particular region may be newly determined as a part of a background region.

The first difference image may be divided into a plurality of sub-regions and a value, obtained by multiplying a number of pixels having first difference image data of which values are non-zero in each of the sub-regions and either an average value of first difference image data in the corresponding sub-region or a value obtained by processing the average value, may be determined as a first preset value of the corresponding sub-region.

The second difference image may be divided into a plurality of sub-regions and a value, obtained by multiplying a number of pixels having second difference image data of which values are non-zero in each of the sub-regions and either an average value of second difference image data in the corresponding sub-region or a value obtained by processing the average value, is determined as a second preset value of the corresponding sub-region.

According to another embodiment of the present invention a computer readable recording medium is provided. The computer readable recording medium has recorded thereon a computer program for executing the method described previously.

BRIEF DESCRIPTION OF THE DRAWINGS

The above and other features and advantages of the present invention will become more apparent by describing in detail exemplary embodiments thereof with reference to the attached drawings in which:

FIG. 8 is a flowchart roughly showing an example of a method of controlling a digital apparatus according to another embodiment of the present invention.

DETAILED DESCRIPTION OF THE INVENTION

The present invention will now be described more fully with reference to the accompanying drawings, in which exemplary embodiments of the invention are shown.

Figure 1:
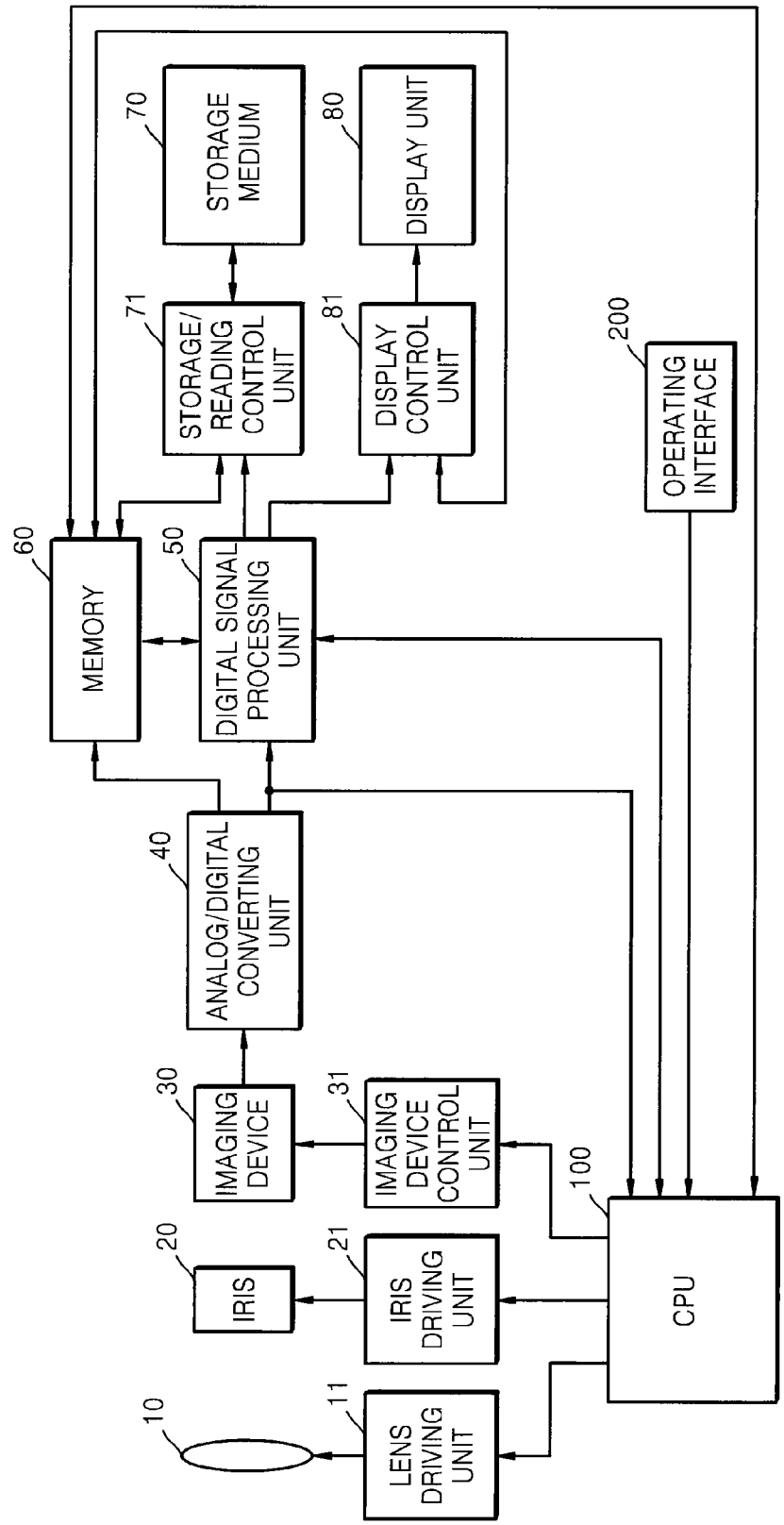
FIG. 1 is a block diagram roughly illustrating an example of a digital photographing apparatus according to an embodiment of the present invention.
Figure 2:
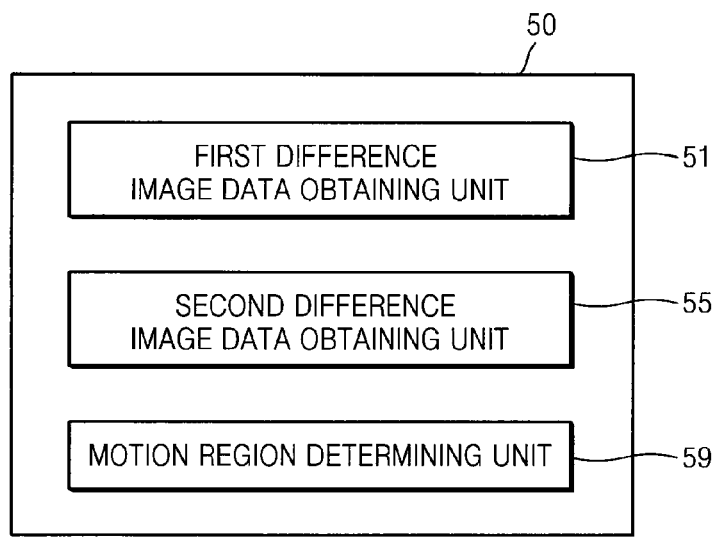
FIG. 2 is a block diagram showing an example of the general structure of one part of FIG. 1.

FIG. 1 is a block diagram roughly illustrating an example of a digital photographing apparatus according to an embodiment of the present invention, and FIG. 2 is a block diagram showing an example of the general structure of one part of FIG. 1.

Overall operations of the digital photographing apparatus are controlled by a central processing unit (CPU) 100. Furthermore, the digital photographing apparatus includes an operating interface 200 including keys for a user to activate and thus generate corresponding electric signals. Electric signals from the operating interface 200 are transmitted to the CPU 100. In this way, the CPU 100 can control the digital photographing apparatus according to the electric signals.

In a photographing mode, as an electric signal resulting from a user's operation interface selection is applied to the CPU 100, the CPU 100 analyzes the electric signal and based thereon controls a lens driving unit 11, an iris driving unit 21, and an imaging device control unit 31, for example. Thus, the position of a lens 10, the opening of an iris 20, and the sensitivity of an imaging device 30 can be respectively controlled. The imaging device 30 generates analog data with respect to light incident thereto, and an analog/digital converting unit 40 converts analog data output from the imaging device 30 into digital data. The analog/digital converting unit 40 may be omitted, depending on characteristics of the imaging device 30.

Data from the imaging device 30 may be input to a digital signal processing unit 50 via a memory 60, may be directly input to the digital signal processing unit 50, and may be input to the CPU 100 if required, for example. Here, the term memory 60 refers to read only memories (ROM) and random access memories (RAM), for example. The digital signal processing unit 60 may perform digital signal processes, such as gamma correction, white balance adjustment, and the like, for example, as an occasion demands. Furthermore, as described below, the digital signal processing unit 50 may include a first difference image data obtaining unit 51, a second difference image data obtaining unit 55, and a motion region determining unit 59, for example, so that the digital signal processing unit 50 can effectively determine existence of a motion region corresponding to a part of a region photographed by the digital photographing apparatus, the part in which a motion occurs with respect to the passage of time. However, the present invention is not limited thereto. For example, the first difference image data obtaining unit 51, the second difference image data obtaining unit 55, and the motion region determining unit 59 may not be parts of the digital signal processing unit 50, but may instead be independent components. Furthermore, the first difference image data obtaining unit 51, the second difference image data obtaining unit 55, and the motion region determining unit 59, for example, may be parts of another component other than the digital signal processing unit 50. In other words, the digital photographing apparatus according to the current embodiment includes the first difference image data obtaining unit 51, the second difference image data obtaining unit 55, and the motion region determining unit 59, for example, but the location of these units may be varied and all such combinations are included in the current embodiment of the present invention. Functions of the first difference image data obtaining unit 51, the second difference image data obtaining unit 55, and the motion region determining unit 59 will be described later.

Data that is output from the digital signal processing unit 50 is transmitted to a display control unit 81 either directly or via the memory 60, for example. The display control unit 81 controls a display unit 80 such that the data is displayed on the display unit 80. Furthermore, the data output from the digital signal processing unit 50 is input to a storage/reading control unit 71 either via the memory or directly, for example. The storage/reading control unit 71 stores the data to a storage medium 70 either automatically or according to a signal from a user. Of course, the storage/reading control unit 71 can also read data from a file stored in the storage medium 70 and input the data to the display control unit 81 either via the memory 60 or via another path such that the data is displayed on the display unit 80. The storage medium 70 may be either a detachable medium or a medium that is permanently fixed to the digital photographing apparatus, for example.

In such a digital photographing apparatus, not all of the components described above are always required. In other words, components including the lens driving unit 11, the iris driving unit 21, and the like, for example, may be omitted. As long as a digital apparatus includes the imaging device 30, the first difference image data obtaining unit 51, the second difference image data obtaining unit 55, and the motion region determining unit 59, then the digital apparatus is sufficient as being a digital photographing apparatus according to the current embodiment. Hereinafter, functions of the first difference image data obtaining unit 51, the second difference image data obtaining unit 55, and the motion region determining unit 59 will be described by referring to the examples of FIGS. 3A through 3C.

Figure 3A:
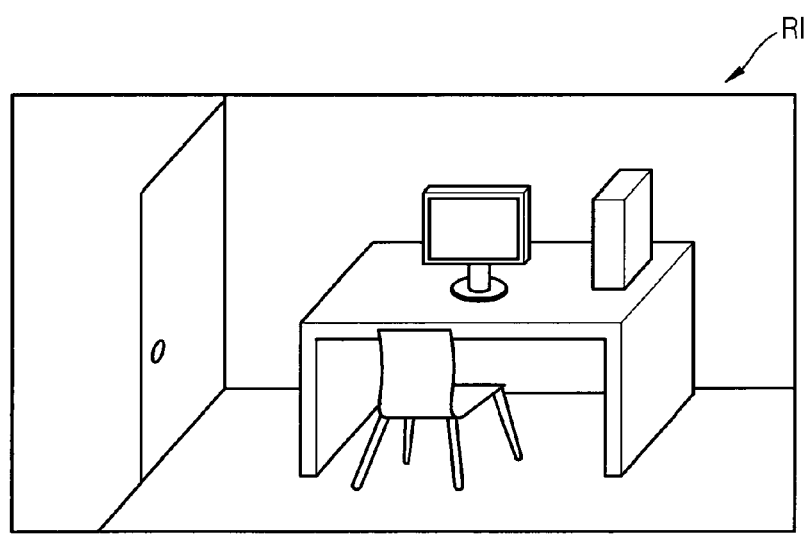
FIG. 3A is a conceptual view of an example of a reference image.
Figure 3B:
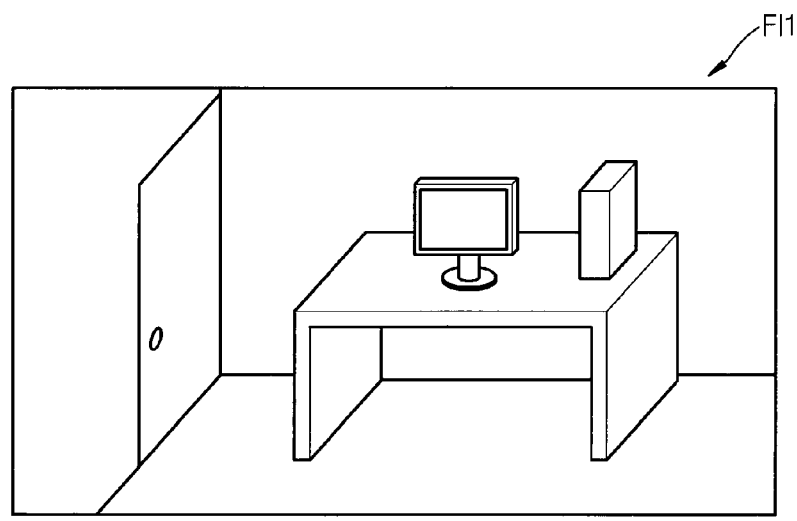
FIG. 3B is a conceptual view of an example of a frame image.
Figure 3C:
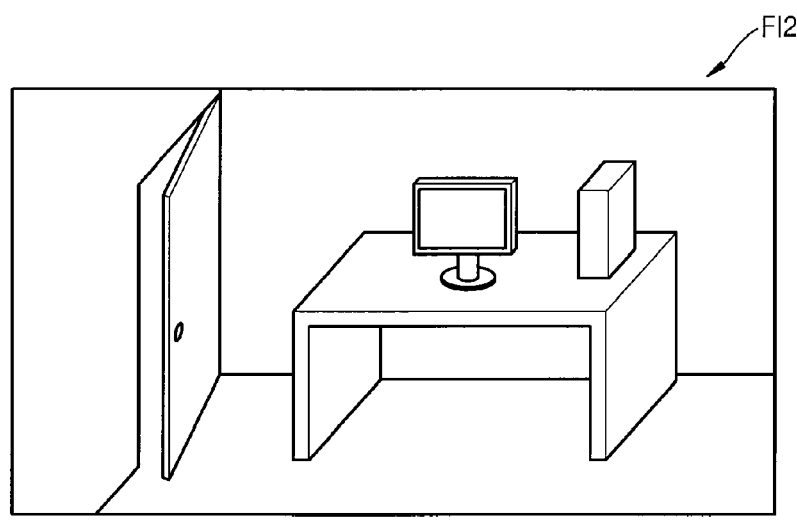
FIG. 3C is a conceptual view of another example of a frame image.

FIG. 3A is a conceptual view of an example of a reference image RI. FIG. 3B is a conceptual view of an example of a frame image FI1. FIG. 3C is an example of a conceptual view of another example of a frame image FI2.

The reference image RI refers to an image that is a reference utilized for later determination of the existence of a motion region. In other words, if locations of subjects in a frame image obtained later are different from those in the reference image RI, a region in which the change has occurred is determined to be a motion region. In this regard, when the frame image FI1 shown in FIG. 3B is obtained and is compared to the reference image RI, it can be detected that a chair has disappeared. Thus, a region in which the chair has disappeared is determined to be a motion region. Meanwhile, if there is no change in locations of the subjects after the chair has disappeared, frame images the same as the frame image FI1 shown in FIG. 3B will be continuously obtained thereafter. In this case, there is actually no motion. However, if newly obtained frame images are continuously compared to the reference image RI, the region in which the chair has disappeared will be continuously determined as a motion region. Furthermore, if the frame image FI2 showing that a door is opened is obtained later, a region in which the door moved is actually a motion region. However, if the frame image FI2 is compared to the reference image RI, both the region in which the chair has disappeared and the region in which the door has moved are determined as motion regions.

Furthermore, if only the frame images such as the frame images FI1 and FI2 shown in FIGS. 3B and 3C, for example, are compared to each other, when a noise occurs in one of the compared frame images, a noisy region is also determined as a motion region. Furthermore, if only the frame images such as the frame images FI1 and FI2 shown in FIGS. 3B and 3C, for example, are compared to each other, when the brightness of subjects are similar to that of the background, a motion region cannot be precisely determined.

Therefore, in the case where the reference image RI shown in FIG. 3A is a reference image, the frame image FI1 is a previous frame image, and the frame image FI2 is a current frame image, the first difference image data obtaining unit 51 obtains first difference image data, which represents data regarding a difference between the reference image RI and the current frame image FI2, and the second difference image data obtaining unit 55 obtains second difference image data, which represents data regarding a difference between the current frame image FI2 and the previous frame data FI1, and the motion region determining unit 59 determines a motion region in the current frame image FI2 by using the first difference image data and the second difference image data, in a digital photographing apparatus according to the current embodiment to resolve the aforementioned problems.

An example will be described below. With reference to the reference image RI, a chair disappears as shown in FIG. 3B. After a time period during which no changes have occurred to locations of the subjects after the chair has disappeared, a door is opened as shown in FIG. 3C. In this case, the opening of the door is a motion, and thus a region in which the door is opened should be determined as a motion region.

A first difference image obtained by the first difference image data obtaining unit 51 is a first difference image corresponding to differences between the current frame image FI2 and the reference image RI, and thus provides evidence for determining the region in which the door is opened and a region in which the chair disappeared as motion regions.

A second difference image obtained by the second difference image data obtaining unit 55 is a second difference image corresponding to differences between the current frame image FI2 and the previous frame image FI1, and thus provides evidence for determining the region in which the door is opened as a motion region.

Furthermore, there may be differences between the current frame image FI2 and the previous frame image FI1 due to noise. As a result, evidence for determining a noisy region as a motion region is provided by the second difference image. Thus, the motion region determining unit 59 analyzes the first difference image data and the second difference image data, for example, and precisely determines the region in which the door is opened as a motion region in the current frame image.

More particularly, the motion region determining unit 59 determines a region, where the first difference image data is smaller than a first preset value in the first difference image, as a background region, determines a region, where the first difference image data is greater than the first preset value in the first difference image and the second difference image data is greater than a second preset value in the second difference image, as a motion region, and determines a region, where the first difference image data is greater than the first preset value in the first difference image and the second difference image data is smaller than the second preset value in the second difference image, as a sub-background region, for example.

In the first difference image, the first difference image data is image data corresponding to differences between the current frame image FI2 and the reference image RI, for example. Thus, the first difference image data at a pixel in the first difference image is a data difference between corresponding pixels in the current frame image FI2 and the reference image RI, for example. Therefore, the region in which the first difference image data is smaller than the first preset value in the first difference image may be a region in which no significant change occurred both in the current frame image FI2 and the reference image RI. Although it is preferable that the first difference image data should be zero in a region in which no change occurred both in the current frame image FI2 and the reference image RI, the first difference image data may be non-zero due to factors such as noise, and the like, for example. Thus, a region in which the first difference image data is smaller than the first preset value in the first difference image is determined as a region with no changes in both of the current frame image FI2 and the reference image RI. Here, the region with no changes refers to a region in which no motion occurred, that is, a background region. In the case of the examples of FIGS. 3A and 3C, a region other than the region in which the door is opened and the region in which the chair disappeared will be determined as a background region.

If the first difference image data is greater than the first preset value in the first difference image, it is necessary to determine whether the region in which the first difference image data is greater than the first preset value in the first difference image is a motion region or not. The regions in which the first difference image data is greater than the first preset value in the first difference image are the region in which the door is opened and the region in which the chair disappeared. However, referring to the current frame image FI2 and the previous frame image FI1, only the region in which the door is opened is a motion region. For such a determination, the second difference image data is utilized. In this situation, there may be two possible cases, for example.

The first case is a case in which the second difference image data is smaller than the second preset value in the second difference image. In the second difference image, the second difference image data is data corresponding to differences between the current frame image FI2 and the previous frame image FI1. Thus, the second difference image data at a pixel in the second difference image is a data difference between corresponding pixels in the current frame image FI2 and the previous frame image FI1.

Therefore, the region in which the second difference image data is smaller than the second preset value in the second difference image may be a region in which no significant change occurred both in the current frame image FI2 and the previous frame image FI1. Although it is preferable that the second difference image data should be zero in a region in which no change occurred both in the current frame image FI2 and the previous frame image FI1, the second difference image data may be non-zero due to factors such as noise, and the like, for example. Thus, a region in which the second difference image data is smaller than the second preset value in the second difference image is determined as a region with no changes in both of the current frame image FI2 and the previous frame image FI1. In this regard, the region with no changes refers to a region in which no motion occurred. In this regard, the region with no changes is defined as a sub-background region. In the case of the examples of FIGS. 3B and 3C, a region in which the region in which the chair disappeared will be determined as a sub-background region.

The second case is a case in which the second difference image data is greater than the second preset value in the second difference image. In the second difference image, a region in which the second difference image data is greater than the second preset value may be a region in which significant change occurred between the current frame image FI2 and the previous frame image FI1. Thus, the region will be determined as a motion region.

Of course, the region in which the second difference image data is greater than the second preset value may be considered as a motion region without considering the first difference image data. However, in this case, a motion region may be determined due to factors such as noise even though no motion actually occurs.

In the case of a digital photographing apparatus according to an embodiment of the present invention, conditions for determining a motion region are configured based on the first difference image data, and then the motion region is determined by additionally analyzing the second difference image data. Thus, possible errors which may occur when only the second difference image data is analyzed can be effectively prevented. For example, if only the second difference image data is analyzed, then the second difference image data may be greater than the second preset value at a region in which a desk is located, due only to noise. In this case, the region will be determined as background region only if the first difference image data is smaller than the first preset value.

Generally, noise is randomly distributed throughout an image. Thus, a noisy region of the second difference image data is different from a noisy region of the first difference image data. Therefore, even if noise occurred in the desk region in the second difference image, it is unlikely that noise will also occur in the desk region in the first difference image. Accordingly, possible problems which may occur when only the second difference image data is analyzed for determining a motion region can be prevented.

Meanwhile, in the case where the motion region determining unit 59 determines a region as a sub-background region throughout a predetermined number of frame images, the sub-background region may be determined as a part of a background region. For example, in the case where frame images as shown in the example of FIG. 3B are continuously obtained and are compared to a reference image as shown in the example of FIG. 3A, the region in which the chair disappeared will be continuously determined as a sub-background region. In this case, the region in which the chair disappeared is no longer a motion region, and thus may be considered as a background region instead of a sub-background region. Furthermore, if the motion region determining unit 59 determines a region as a sub-background region throughout a predetermined number of frame images, the reference image may be updated to an image as shown in the example of FIG. 3B instead of an image as shown in the example of FIG. 3A.

Although it is described hitherto that data is obtained by each pixel when obtaining the first difference image data and the second difference image data, it is clear that the present invention is not limited thereto. In other words, data may be compared to each other by dividing an image into a plurality of sub-regions, as described below with reference to the example of FIG. 4.

Figure 4:
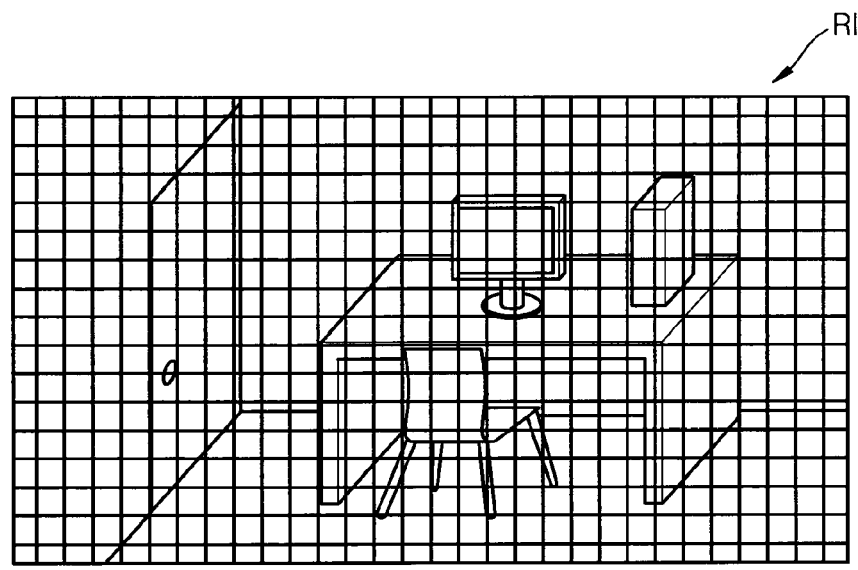
FIG. 4 is a conceptual view of an example of a reference image divided into a plurality of sub-regions for processing reference image data regarding the reference image.

FIG. 4 is a conceptual view of an example of a reference image RI divided into a plurality of sub-regions for processing reference image data regarding the reference image RI. Accordingly, a reference image is divided into a plurality of sub-regions, and values obtained by processing data in the sub-regions are considered as data of corresponding sub-regions. For example, an average value of data in each of the sub-regions may be considered as data of a corresponding sub-region. Generally, noise is randomly distributed throughout an image, and effects due to the noise can be eliminated by processing data in the sub-regions. Thus, erroneous results due to noise can be effectively prevented. Other than a reference image, each of the previous frame image FI1 and the current frame image FI2 as shown in the examples of FIGS. 3B and 3C are also divided into a plurality of sub-regions, and values obtained by processing data in the sub-regions are considered as data of corresponding sub-regions.

Thereafter, the first difference image data obtaining unit 51 may obtain first difference image data regarding a first difference image having a plurality of sub-regions, by using data in sub-regions of the reference image RI and the current frame image FI2 corresponding to each other.

The second difference image data obtaining unit 55 may obtain second difference image data regarding a second difference image having a plurality of sub-regions, by using data in sub-regions of the current frame image FI2 and the previous frame image FI1 corresponding to each other. In this case, the motion region determining unit 59 determines a motion region, by using the first difference image data regarding the first difference image having the plurality of sub-regions and the second difference image data regarding the second difference image having the plurality of sub-regions. Although operations of the motion region determining unit 59 are the same as described above, except that the target of comparison is data per sub-region. Therefore, the amount of data to be considered is significantly reduced as compared to the case of considering data in units of pixels, and thus a digital photographing apparatus capable of effectively determining a motion region can be embodied without requiring the digital photographing apparatus to have high performance hardware.

Figure 5:
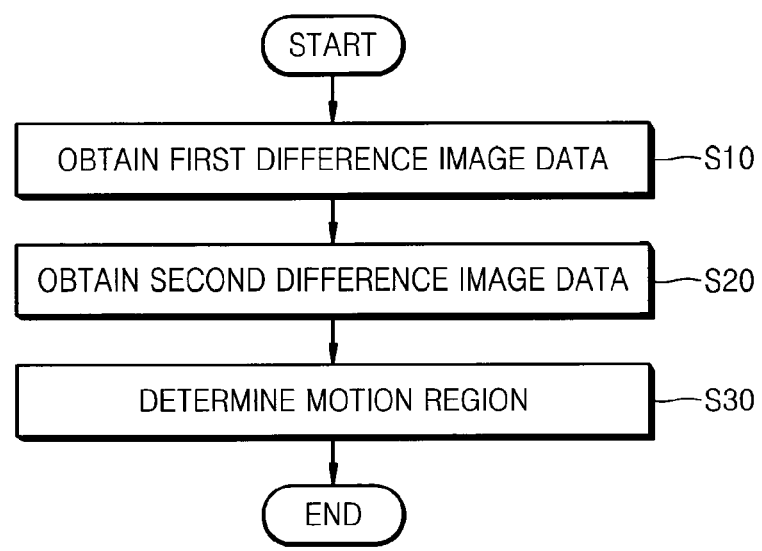
FIG. 5 is a flowchart roughly showing an example of a method of controlling a digital apparatus according to another embodiment of the present invention.

FIG. 5 is a flowchart roughly showing an example of a method of controlling a digital apparatus according to another embodiment of the present invention.

First, first difference image data regarding a first difference image, which represents a difference between a reference image and a current frame image, is obtained (operation S10), and second difference image data regarding a second difference image, which represents a difference between the current frame image and a previous frame image, is obtained (operation S20). Of course, for example, the sequence of the operations S10 and S20 may be reversed, and the operations S10 and S20 may also be simultaneously performed in parallel. After obtaining the first difference image data and the second difference image data, a motion region in the current frame image is determined using the first difference image data and the second difference image data (operation S30). Accordingly, a motion region can be determined precisely.

More particularly, the operation S30 may be an operation of determining a region in which the first difference image data is smaller than a first preset value in the first difference image as a background region, determining a region in which the first difference image data is greater than the first preset value in the first difference image and the second difference image data is greater than a second preset value in the second difference image as a motion region, and determining a region in which the first difference image data is greater than the first preset value in the first difference image and the second difference image data is smaller than the second preset value as a sub-background region. Logical backgrounds of the operations above are described above with reference to the examples of FIGS. 3A through 3C. Of course, in the case where a particular region is determined throughout a predetermined number of frame images as a sub-background region, the particular region may be changed from being a sub-background region and may instead be newly determined as a part of a background region.

Furthermore, as described above by referring to the example of FIG. 4, an amount of data to be processed can be significantly reduced by dividing each of the reference image, the current frame image, and the previous frame image into a plurality of blocks. In other words, when obtaining the first difference image data and the second difference image data respectively in the operations S10 and S20, each of the reference image, the current frame image, and the previous frame image are divided into a plurality of sub-regions (refer to the example of FIG. 4), and values obtained by processing data in the sub-regions are considered as data of corresponding sub-regions. Furthermore, the first difference image data regarding a first difference image including a plurality of sub-regions and the second difference image data regarding a second difference image including a plurality of sub-regions can be obtained using the reference image, the current frame image, and the previous frame image. Here, values obtained by processing data in the sub-regions may be average values of data in each of the sub-regions.

Figure 6:
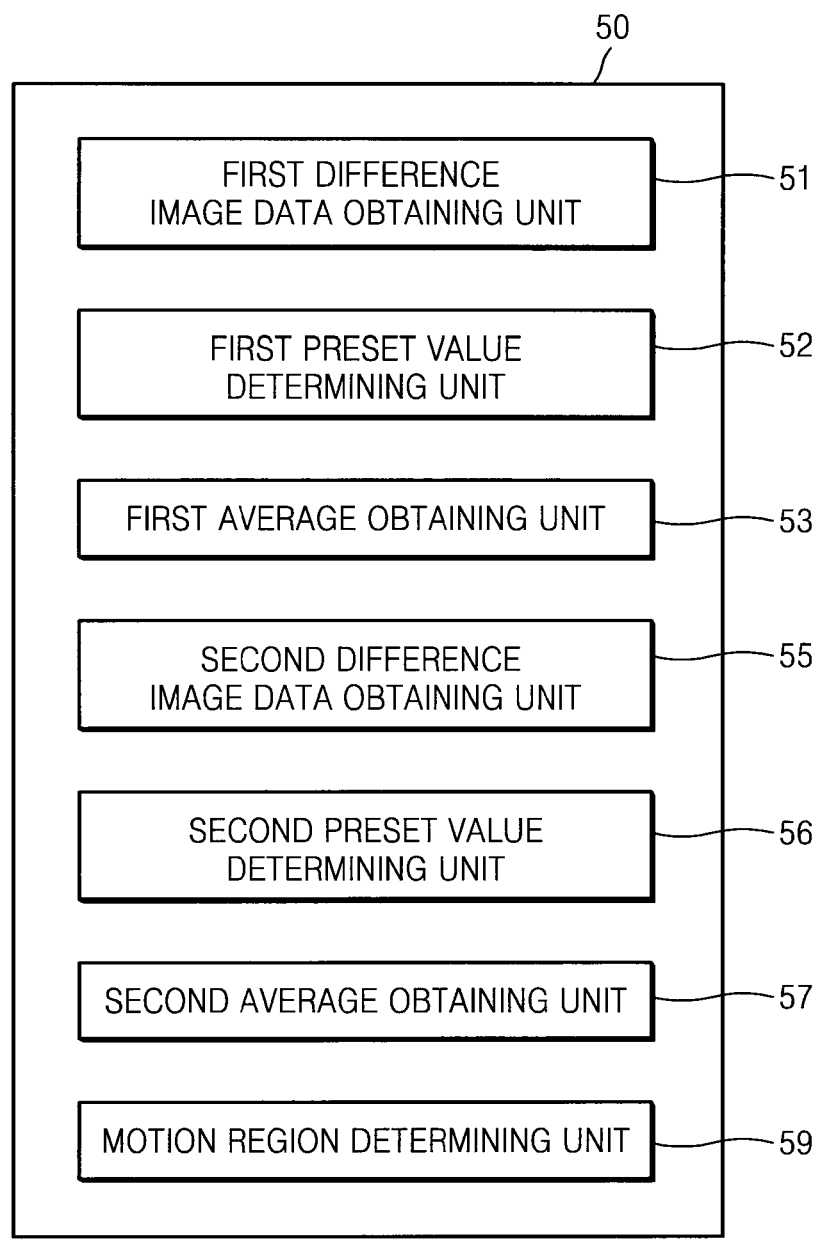
FIG. 6 is a block diagram partially showing an example of a digital photographing apparatus according to another embodiment of the present invention.

FIG. 6 is a block diagram partially showing an example of a digital photographing apparatus according to another embodiment of the present invention. The difference between the digital photographing apparatus according to the current embodiment and the digital photographing apparatus according to the previous embodiment shown in the example of FIG. 2 is that the digital photographing apparatus according to the current embodiment further comprises a first preset value determining unit 52, a first average obtaining unit 53, a second preset value determining unit 56, and a second average obtaining unit 57.

The first preset value determining unit 52, the first average obtaining unit 53, the second preset value determining unit 56, and the second average obtaining unit 57 may be parts of the digital signal processing unit 50. Furthermore, first preset value determining unit 52, the first average obtaining unit 53, the second preset value determining unit 56, and the second average obtaining unit 57 may not be parts of the digital signal processing unit 50 and may be independent components.

Operations of the first difference image data obtaining unit 51 and the second difference image data obtaining unit 55 are same as described above in the previous embodiment.

The first preset value determining unit 52 divides a first difference image into a plurality of sub-regions and determines a value, which is obtained by multiplying either a value of a composition ratio of pixels having first difference image data of which the values are non-zero in each of the sub-regions or a value obtained by processing the value of a composition ratio and either an average value of first difference image data in the corresponding sub-region or a value obtained by processing the average value, as a first preset value in the corresponding sub-region. Here, a composition ratio of pixels having first difference image data of which values are non-zero in a region means the number of pixels having first difference image data of which values are non-zero in the region over the total number of pixels in the region. Generally, noise is randomly distributed throughout an image, and thus effects due to the noise can be eliminated by processing data in the sub-regions.

Figure 7A:
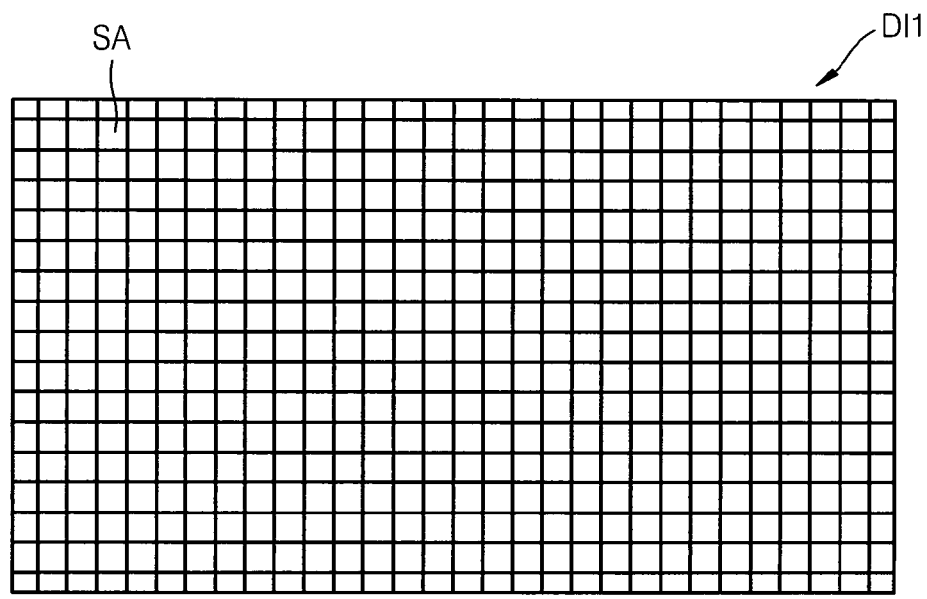
FIG. 7A is a conceptual view of an example of a first difference image divided into a plurality of sub-regions for processing first difference image data regarding the first difference image.

FIG. 7A is a conceptual view of an example of a first difference image divided into a plurality of sub-regions for processing first difference image data regarding the first difference image As shown in the example of FIG. 7A, a first difference image DI1 is divided into a plurality of sub-regions.

Figure 7B:
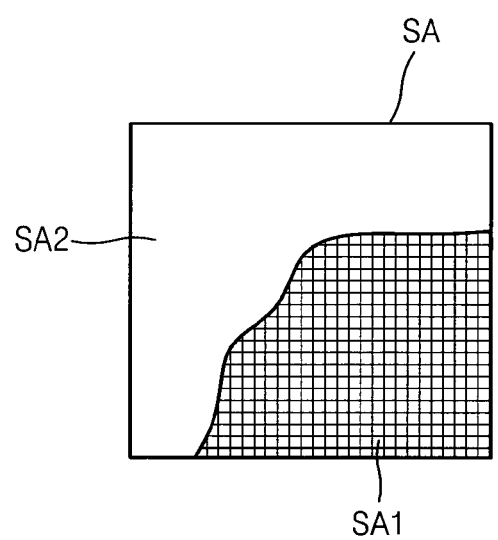
FIG. 7B is a conceptual view of an example of one of the sub-regions of the first difference image of FIG. 7A.

FIG. 7B is a conceptual view of an example of one of the sub-regions of the first difference image DI1 of FIG. 7A. In FIG. 7B, a region marked as SA1 is a region in which pixels, having first difference image data of which values are non-zero, are present, and a region marked as SA2 is a region in which pixels, having first difference image data of which values are zero, are present. The first preset value determining unit 52 determines a value, obtained by multiplying the number of pixels having first difference image data of which values are non-zero in a sub-region SA as shown in FIG. 7B and either an average value of first difference image data in the corresponding sub-region SA or a value obtained by processing the average value, as a first preset value of the corresponding sub-region SA. The first preset value determining unit 52 configures first preset values in each of the sub-regions SA. The first average obtaining unit 53 calculates an average value of the first preset values of the first difference image.

Like the first preset value determining unit 52, the second preset value determining unit 56 divides a second difference image into a plurality of sub-regions, and determines a value, obtained by multiplying either a value of composition ratio of pixels having second difference image data of which the values are non-zero in each of the sub-regions or a value obtained by processing the value of composition ratio and either an average value of second difference image data in the corresponding sub-region or a value obtained by processing the average value, as a second preset region in the corresponding sub-region. Processing a value means multiplying a value by a specific number, squaring the value, dividing the value by a specific number, or performing any other type of mathematical processing.

For example, the second preset value determining unit 56 divides the second difference image into a plurality of sub-regions, and may determine a value, obtained by multiplying a number of pixels having second difference image data of which values are non-zero in a sub-region by either an average value of second difference image data in the corresponding sub-region or a value obtained by processing the average value, as a second preset value in the corresponding sub-region. The second average obtaining unit 57 calculates an average value of the second preset values of the second difference image.

The motion region determining unit 59 determines a sub-region in which the first preset value is smaller than the average value of the first preset values as a background region, determines a sub-region in which the first preset value is greater than the average value of the first preset values and the second preset value is greater than the average value of the second preset values, as motion regions, and determines a sub-region in which the first preset value is greater than the average value of the first preset values and the second preset value is smaller than the average value of the second preset values as sub-background regions.

In the digital photographing apparatus according to the previous embodiment described with reference to the example of FIG. 2, the first preset value and the second preset value are non-variable values configured in advance. When the first preset value and/or the second preset value are too large, if there is no significant difference among brightness of a reference image, a current frame image, and a previous frame image, if there is no significant difference between brightness of a motion region and a background region while a motion actually occurred, or if, while a motion actually occurred, the size of data corresponding to a region of a first difference image and a second difference image, in which the motion occurred, is not significant enough, it may be erroneously determined that there is no motion region although a motion actually occurred. In contrast, if the first preset value and/or the second preset value are too small, a motion region may be erroneously determined while no motion actually occurred.

However, in the case of the digital photographing apparatus according to the current embodiment, the first preset value and the second preset value are respectively determined by the first preset value determining unit 52 and the second preset value determining unit 56 according to circumstance, and thus the problem of the erroneously determination can be effectively prevented by changing the first preset value and the second preset value.

Especially, because the first preset value and an average value of the first average values in each of the sub-regions and the second preset value and an average value of the second average values in each of the sub-regions, if a difference between the brightness of the first difference image and the second difference image is significant, the average value of the first preset values and the average value of the second preset values also become significant.

In contrast, if a difference between the brightness of the first difference image and the second difference image is insignificant, the average value of the first preset values and the average value of the second preset values also become insignificant. Thus, the existence of a motion region can be effectively determined by actively changing reference values (the average value of the first preset values and the average value of the second preset values) for determining a motion region.

For example, it may be erroneously determined that a motion region, in which a motion actually occurred, is not a motion region if the first preset values of each of the sub-regions are compared to a reference value greater than the average value of the first preset values when the average value of the first preset value is small. Furthermore, it may be erroneously determined that a region, in which no motion actually occurred, is a motion region if the first preset values of each of the sub-regions are compared to a reference value smaller than the average value of the first preset values when the average value of the first preset value is large. The digital photographing apparatus according to the present invention can prevent such problems.

Meanwhile, even in the current embodiment, if the motion region determining unit 59 determines a particular region throughout a predetermined number of frame images as a sub-background region, the particular region may be changed from being a sub-background region and may instead be newly determined as a part of a background region.

FIG. 8 is a flowchart roughly showing an example of a method of controlling a digital apparatus according to another embodiment of the present invention.

First, first difference image data regarding to a first difference image, which represents a difference between a reference image and a current frame image, is obtained (operation S10). The first difference image is divided into a plurality of sub-regions, and a value, obtained by multiplying a value of composition ratios of pixels having first difference image data of which the values are non-zero in each of the sub-regions or a value obtained by processing the value of a composition ratio and either an average value of first difference image data in the corresponding sub-region or a value obtained by processing the average value, is determined as a first preset value in the corresponding sub-region (operation S12). An average value of the first preset values is calculated (operation S14).

Meanwhile, second difference image data regarding to a second difference image, which represents a difference between the current frame image and a previous frame image, is obtained (operation S20). The second difference image is divided into a plurality of sub-regions, and a value, obtained by multiplying a value of composition ratios of pixels having second difference image data of which the values are non-zero in each of the sub-regions or a value obtained by processing the value of a composition ratio and either an average value of second difference image data in the corresponding sub-region or a value obtained by processing the average value, is determined as a second preset value in the corresponding sub-region (operation S22). An average value of the second preset values is calculated (operation S24). Here, various changes may be made to the method. For example, the operations S20 through S24 may be performed after the operations S10 through S14 are completed. Furthermore, the operations S10 through S14 may be performed after the operations S20 through S24 are completed. Furthermore, the operations S10 through S14 and the operations S20 through S24 may be simultaneously performed in parallel.

Next, a motion region is determined (operation S30). More particularly, a sub-region of the first difference image in which the first preset value is smaller than the average value of the first preset values is determined as a background region. A sub-region of the first difference image in which the first preset value is greater than the average value of the first preset values and a corresponding sub-region of the second difference image in which the second preset value is greater than the average value of the second preset values is determined as a motion region.

A sub-region of the first difference image in which the first preset value is smaller than the average value of the first preset values and a corresponding sub-region of the second difference image in which the second preset value is smaller than the average value of the second preset values is determined as a sub-background region. Of course, in the case of determining a particular region throughout a predetermined number of frame images, the sub-background region may be determined as a part of the background region.

Meanwhile, the operation S12 may be an operation of dividing the first difference image into a plurality of sub-regions and determining a value, obtained by multiplying a number of pixels having the first difference image data of which values are non-zero in each of the sub-pixels and either an average value of the first difference image data in the corresponding sub-region or a value obtained by processing the average value, as a first preset value in the corresponding sub-region. Similarly, the operation S22 may be an operation of dividing the second difference image into a plurality of sub-regions and determining a value, obtained by multiplying a number of pixels having the second difference image data of which values are non-zero in each of the sub-pixels and either an average value of the second difference image data in the corresponding sub-region or a value obtained by processing the average value, as a second preset value in the corresponding sub-region.

Computer programs for executing methods of determining a motion region according to the embodiments described above and variant embodiments thereof in a digital photographing apparatus may be stored in a recording medium, for example. In this regard, the recording medium may be, for example, the storage medium 70 as shown in FIG. 1, the memory 60 as shown in FIG. 1, or a separate recording medium. In this regard, examples of the computer readable recording medium include magnetic storage media (for example, ROM, floppy disks, hard disks, and the like) and optical recording media (for example, CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
an imaging device that generates data from light incident thereto;
a first difference data obtaining unit that obtains first difference data, which represents a difference between a reference image and a current frame image;
a second difference data obtaining unit that obtains second difference data, which represents a difference between the current frame image and a previous frame image; and
a motion region determining unit that determines a motion region in the current frame image by comparing the first difference data with the second difference data, wherein the motion region determining unit:
determines a background region in which the first difference data is smaller than first preset values,
determines the motion region in which the first difference data is greater than the first preset values and the second difference data is greater than second preset values,
determines a sub-background region in which the first difference data is greater than the first preset values and the second difference data is smaller than the second preset values, and
determines a particular region which has been a part of the sub-background region to be part of the background region if the particular region does not change throughout a predetermined number of frame images.

2. The digital photographing apparatus of claim 1, wherein the first difference data obtaining unit divides each of the reference image and the current frame image into a plurality of sub-regions, considers values obtained by processing data in each of the sub-regions as data for corresponding sub-regions, and obtains the first difference data including a plurality of sub-regions by using data in sub-regions of the reference image and the current frame image corresponding to each other, and
the second difference data obtaining unit divides each of the reference image and the current frame image into a plurality of sub-regions, considers values obtained by processing data in each of the sub-regions as data for corresponding sub-regions, and obtains the second difference data including a plurality of sub-regions by using data in sub-regions of the reference image and the current frame image corresponding to each other.

3. The digital photographing apparatus of claim 2, wherein the first difference data obtaining unit and the second difference data obtaining unit consider average values of each of the sub-regions as data of the corresponding sub-regions.

4. A method of determining a motion region, the method comprising:
generating data from light incident thereto;
obtaining first difference data using a processor, which represents a difference between a reference image and a current frame image;
obtaining second difference data using the processor, which represents a difference between the current frame image and a previous frame image; and
determining a motion region in the current frame image by comparing the first difference data with the second difference data, wherein the determining of the motion region comprises:
determining a background region in which the first difference data is smaller than first preset values;
determining the motion region in which the first difference data is greater than the first preset values and the second difference data is greater than second preset values;
determining a sub-background region in which the first difference data is greater than the first preset values and the second difference data is smaller than the second preset values; and
determining a particular region which has been a part of the sub-background region to be part of the background region if the particular region does not change throughout a predetermined number of frame images.

5. The method of claim 4, wherein, when the first difference data and the second difference data are obtained, each of the reference image and the current frame image is divided into a plurality of sub-regions,
values obtained by processing data in each of the sub-regions are considered as data for corresponding sub-regions, and
the first difference data including a plurality of sub-regions and the second difference data including a plurality of sub-regions are determined by using data in sub-regions of the reference image and the current frame image which correspond to each other.

6. The method of claim 5, wherein average values of each of the sub-regions are considered as data of the corresponding sub-regions.

7. A non-transitory computer readable recording medium having recorded thereon a computer program for executing the method of claim 4.

* * * * *